(12) United States Patent
Heinrichs et al.

(10) Patent No.: US 12,025,164 B2
(45) Date of Patent: Jul. 2, 2024

(54) PLUG-IN COUPLING WITH TOLERANCE COMPENSATION

(71) Applicant: Böllhoff Verbindungstechnik GmbH, Bielefeld (DE)

(72) Inventors: Heinrich Heinrichs, Vlotho (DE); Jan Norman Kratzsch, Halle (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 656 days.

(21) Appl. No.: 17/277,365

(22) PCT Filed: Sep. 17, 2019

(86) PCT No.: PCT/EP2019/074888
§ 371 (c)(1),
(2) Date: Mar. 18, 2021

(87) PCT Pub. No.: WO2020/069857
PCT Pub. Date: Apr. 9, 2020

(65) Prior Publication Data
US 2021/0355979 A1    Nov. 18, 2021

(30) Foreign Application Priority Data
Oct. 2, 2018  (DE) .......................... 102018124406.1

(51) Int. Cl.
F16B 21/07    (2006.01)
(52) U.S. Cl.
CPC ................. F16B 21/075 (2013.01)
(58) Field of Classification Search
CPC .................................................. F16B 21/075
See application file for complete search history.

(56) References Cited

U.S. PATENT DOCUMENTS

| 3,889,320 A | 6/1975 | Koscik |
| 5,038,444 A | 8/1991 | Gordon |

(Continued)

FOREIGN PATENT DOCUMENTS

| CN | 1638671 A | 7/2005 |
| CN | 101876333 A | 11/2010 |

(Continued)

OTHER PUBLICATIONS

Translation of JP 2012-87824: worldwide.espacenet.com. Dec. 13, 2023.*

(Continued)

*Primary Examiner* — Michael P Ferguson
(74) *Attorney, Agent, or Firm* — Reising Ethington P.C.

(57) ABSTRACT

A coupling seat provides a seat space in which the coupling head of a coupling bolt can be releasably locked and moved linearly in the seat space. The seat has a wall that surrounds the seat space, and the dome has a locking structure to fasten the coupling seat in an installation opening in a component. The seat has an open end and a closed end with a locking structure for the head of the coupling bolt. The locking structure of the dome comprises latching bars that are arranged opposite each other on an inner wall of the seat space and parallel to a longitudinal axis of an inner dome cross-section and form an undercut opposite the insertion direction. The locking structure permits movement of a coupling bolt along the latching bars in the seat space transverse to the insertion direction.

13 Claims, 14 Drawing Sheets

(56) References Cited

U.S. PATENT DOCUMENTS

Figure 1:
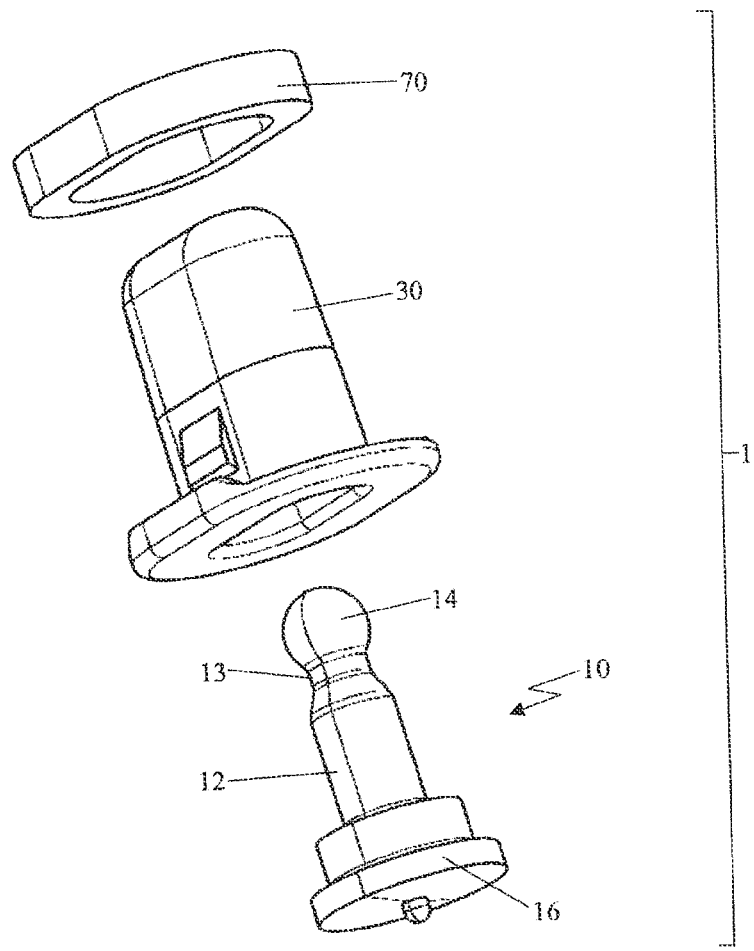

| | | | |
|---|---|---|---|
| 5,193,961 A * | 3/1993 | Hoyle | F16B 21/075 24/297 |
| 5,222,852 A | 6/1993 | Snyder | |
| 5,649,783 A | 7/1997 | Ichikawa et al. | |
| 5,718,549 A * | 2/1998 | Noda | F16B 5/0657 411/553 |
| 6,237,970 B1 | 5/2001 | Joannou | |
| 7,226,233 B2 | 6/2007 | SuBenbach et al. | |
| 8,127,476 B2 | 3/2012 | Bierwith | |
| 9,630,572 B2 | 4/2017 | Wahara et al. | |
| 10,288,098 B2 * | 5/2019 | Meyers | B60R 13/0206 |
| 10,408,248 B1 * | 9/2019 | Safry | F16B 21/086 |
| 10,434,960 B2 | 10/2019 | Kamei et al. | |
| 2005/0115999 A1 | 6/2005 | Johnson | |
| 2007/0031185 A1 | 2/2007 | Bertram et al. | |
| 2013/0125360 A1 | 5/2013 | Boivin et al. | |
| 2020/0332819 A1 | 10/2020 | Matthes et al. | |

FOREIGN PATENT DOCUMENTS

| | | | |
|---|---|---|---|
| CN | 104235125 A | 12/2014 | |
| CN | 108252995 A | 7/2018 | |
| DE | 3902399 A1 | 8/1990 | |
| DE | 4014598 A1 | 11/1991 | |
| DE | 102017123424 A1 | 4/2019 | |
| EP | 1524440 A1 | 4/2005 | |
| EP | 1746294 A1 | 1/2007 | |
| JP | H0284008 U | 6/1990 | |
| JP | H0741018 U | 7/1995 | |
| JP | 2012-87824 * | 5/2012 | F16B 19/00 |
| WO | WO2012017143 A1 | 2/2012 | |
| WO | WO2015024777 A1 | 2/2015 | |

OTHER PUBLICATIONS

English translation of the International Preliminary Report on Patentability for PCT/EP2019/074888 dated Mar. 23, 2021, (8 pages).

CN Allowance for CN Application No. 201910208964.8 dated Sep. 3, 2021 (4 pages).

Written Opinion & International Search Report for PCT/EP2019/074888 dated Dec. 5, 2019, 14 pages.

\* cited by examiner

PLUG-IN COUPLING WITH TOLERANCE COMPENSATION

1. TECHNICAL FIELD

The present disclosure relates to a coupling seat designed as a single part which can be locked into a slot-shaped installation opening of a component, and provides a seat space in which a coupling head of a coupling bolt can be releasably locked and, when in a locked state, can be moved linearly in the seat space. Moreover, the present disclosure relates to a plug-in coupling with the above-described coupling seat and a coupling bolt with a coupling head which can be locked in the coupling seat. In addition, the present disclosure provides a connection of a first component with at least one slot-shaped installation opening for the coupling seat, and a second component to which at least one coupling bolt with a coupling head is fastened. Finally, the present disclosure describes a production method for the coupling seat, in particular an injection molding method.

2. BACKGROUND

In various fields of application within industry such as automobile construction, releasable plug-in connections promote the universal connection of at least two components. Accordingly for example, lights are installed in vehicle bodies, or add-on parts are attached to configure a vehicle interior.

In addition to simplified installation, or respectively simplified joining of two components by such a plug-in coupling, these designs also serve to dampen potential component vibrations. Noise pollution, for example, is thereby reduced within the vehicle. A corresponding example of such a plug-in connection consisting of a coupling seat and a coupling bolt with a ball head is described in EP 1 746 294 A1. The coupling seat of this plug-in coupling consists of an elastic material such as an elastomer to ensure the aforementioned damping of vibration.

If stronger retention force is needed that for example cannot be realized by a plastic coupling seat, the coupling head can also be fixed with stronger retention force. To this end, EP 1 524 440 A1 proposes integrating a metal retaining clamp in the coupling seat.

The disadvantage of the above plug-in connections is that the coupling seat and the coupling bolt to be connected thereto must to be precisely aligned in their position relative to each other. Otherwise, the established plug-in connection is under mechanical stress or is not at all feasible due to misalignment of the coupling seat and coupling bolt.

In order to prevent this disadvantage, DE 10 2017 123 424 A1, for example, discloses a plug-in coupling with an angle compensation. The coupling seat of this plug-in coupling locks the coupling head of the coupling bolt so that it can still be pivoted within a certain angular range. Despite the pivoting, i.e., the change in the angular position between coupling bolt and coupling seat, the connection between the coupling seat and coupling bolt is not impaired, or respectively released. To this end, the coupling seat does have an inner lock of the coupling bolt, but also simultaneously allows the shaft of the coupling bolt to pivot by means of a slot-shaped opening in the coupling seat.

Only distantly related to plug-in couplings, DE 40 14 598 C1 describes a connecting option which permits linear tolerance compensation of the established connection. To this end, a body part, for example, is provided with a coupling bolt. A wall panel to be attached thereto has a rail-like section into which the coupling head can be snapped. The coupling head is arranged therein in a linearly displaceable manner in order to be able to compensate for tolerances.

DE 39 02 399 A1 describes the fastening of a decorative strip holder to a body panel of a motor vehicle. At least two installation openings are provided in the body panel, in each of which an elastically deformable coupling seat is arranged for the end of the coupling bolt. The at least two coupling bolts are movably fastened to the retaining strip. If in particular the fastening points of the retaining strip are not precisely flush with the installation openings and the coupling seats arranged therein, these tolerances must be compensated for. To this end, the coupling bolts are movably arranged in the retaining strip so that imprecisions in the flush alignment of the installation holes can be compensated for before establishing the connection. Once the connection is established between the body part and the retaining strip, the connecting points are fixed by coupling bolts and the coupling seat. Accordingly, tolerance compensation is possible before the connection is established. Nonetheless once the connection exists, the tolerances cannot be compensated for anymore, however, given the lack of mobility of the body part and support strip. This unfortunately leads to mechanical tension in the connection which can stress or even release the established connection.

It is therefore the object of at least some implementations of the present disclosure to provide a single-part coupling seat which is adapted in comparison to the prior art to realize a plug-in connection with which potential tolerances can be compensated for between the components connected to each other even after establishing a plug-in connection without this disadvantageously stressing the established connection.

3. SUMMARY

The above object is achieved by a coupling seat designed as a single part, by a plug-in coupling having this coupling seat, and a matching coupling bolt having a coupling head, by a connection of the first component with at least one slot-shaped installation opening for such a coupling seat and a second component in combination with a coupling bolt, as well as by a production method for the coupling seat. Further embodiments and developments are found in the following description, the accompanying drawings as well as the appending claims.

The present disclosure includes a coupling seat designed as a single part which can be locked in a slot-shaped installation opening in a component. Moreover, the coupling seat is characterized in that it provides a seat space in which a coupling head of a coupling bolt can be releasably locked, and is linearly movable in the seat space in a locked state. Moreover, the coupling seat has the following features: a closed peripheral wall of a cupola-like dome surrounds the seat space of the coupling bolt, wherein the dome has an outer locking structure to fasten the coupling seat in the installation opening in the component, an open end with a slot-shaped insertion opening for inserting the coupling bolt in an insertion direction and a closed end with an inner locking structure adjacent thereto for the coupling head of the coupling bolt, and a slot-shaped opening cross-section of the insertion opening as well as a slot-shaped inner dome cross-section of the seat space, each perpendicular to the insertion direction, are defined by a longitudinal axis and a shorter transverse axis running transverse thereto, and the inner locking structure of the cupola-like dome comprises two inner latching bars that are arranged opposite each other on an inner wall of the seat space and run parallel to the longitudinal axis of the inner dome cross-section and form an undercut relative to the insertion direction, wherein the inner locking structure does not comprise latching bars parallel to the transverse axis of the inner dome cross-section, and permits movement of a locked coupling bolt along the inner latching bar in the seat space transverse to the insertion direction.

Due to its design, the coupling seat provides a seat space for the coupling bolt which does not completely peripherally lock the coupling head in the seat space like a ball socket. Instead, the slot-shaped dome cross-section of the coupling seat ensures that inner latching bars are provided for holding the coupling head only on two mutually opposing walls of the dome.

Since the inner dome walls equipped with inner latching bars run parallel to each other due to the slot-shaped dome cross-section, they form a rail-like fastening option for the coupling bolt. This rail-like fastening option is distinguished in that the coupling bolt, in particular the coupling head, is held in a locked manner opposite the insertion direction, whereas it can be moved transverse to the insertion direction within the seat space and axially guided by the inner latching bars.

This movement option ensures that component tolerances can be compensated for when assembling the first and second component. At the same time, tolerance compensation within the already established connection is possible due to this mobility of the coupling head within the coupling seat. The connection is therefore not impaired if for example an alignment of the two components relative to each other should change for example under thermal strain. Instead, the locked coupling bolt therefore changes its position within the coupling seat in the direction of the longitudinal axis of the dome cross-section, wherein the quality and strength of the connection are retained.

Since the dome cross-section with its slot-shaped design may exist over the entire depth of the coupling seat, i.e., parallel to the insertion direction, the shaft of the coupling bolt connected to the coupling head can follow the compensation movement of the head. This compensation movement is therefore not hindered and guided laterally by the walls of the coupling seat.

According to a further embodiment of the coupling seat, its insertion opening has a peripheral flange which projects radially outward and runs around the insertion opening and forms a contact surface transverse to the insertion direction.

According to another embodiment, the coupling seat is installed in a slot-shaped installation opening in a component. This installation comprises an insertion of the coupling seat in the installation opening, the shape of which is adapted to the coupling seat, whereby the coupling seat is locked in this installation opening. This locking realizes the interaction between the radially projecting flange surrounding the insertion opening in the coupling seat and the outer latching bars on the outside of the cupola-like dome. Since the peripheral flange projects radially, it provides a contact surface for the component adjacent to the installation opening.

Also, the coupling seat comprises a sealing ring which may be arranged on the contact surface of the peripheral flange.

Whereas the peripheral flange realizes the above-described support function in installing the coupling seat in the installation opening of the component, it also may serve as a contact and support surface for a seal of the coupling seat. This seal which may be formed as a peripheral sealing ring, abuts the peripheral flange. Once the coupling seat has been locked in the installation opening in the component, the seal may be held in a compressed state between the component and the peripheral flange of the coupling seat.

This ensures that the installation opening is sealed against the entrance of liquids and contamination given a fitting seat of the sealing ring.

To support the position of the ring on the flange, the longer sides of the flange that oppose each other also may have contact edges or bars that project in the insertion direction. In this manner, the tight ring is held in a channel-like construction between the outer wall of the coupling seat and such bars. The bars may be arranged angled toward the outer wall of the coupling seat and thereby support a press fit or clamping of the sealing ring before installation. In this manner, the laterally arranged bars on the peripheral flange form a transport brace so that the coupling seat can be transported together with the sealing ring to the installation site.

According to another embodiment of the coupling seat, the inner latching bars of the inner locking structure have an approach bevel facing the insertion opening and a latching bevel facing away from the insertion opening, and an angle of inclination of the approach bevel relative to the insertion direction is smaller than an angle of inclination of the latching bevel relative to the insertion direction.

The shape of the inner locking structure in the insertion direction may configure or establish the required assembly force for locking the coupling head in the coupling seat. Moreover, the shape establishes the releasing force for removing the coupling head from the coupling seat. Given this mechanical relationship, the angle of inclination of the approach bevel may be configured smaller relative to the insertion direction than the angle of inclination of the latching bevel, also relative to the insertion direction. This ensures that inserting and connecting two components with the assistance of the coupling seat is made easier for the worker. The smaller angle of inclination of the approach bevel ensures reduced forces for locking the coupling head in the coupling seat.

Once the coupling bolt is fastened in the coupling seat, the coupling head braces against the latching bevels of the inner latching bars. It is only possible to release the coupling bolt from the coupling seat when the coupling head overcomes the latching bevels which are designed more steeply in comparison to the approach bevels. Correspondingly, this geometry and the greater angle of inclination ensure that the retention forces between the coupling seat and coupling bolt are greater than the assembly forces.

The retention of the coupling bolt in the coupling seat may be supported in that the coupling seat consists of a hard rubber or hard plastic. In contrast to conventional plug-in couplings consisting of elastomers, the aforementioned material has a lower elastic deformability. This means that the latching bevels can only be overcome by the coupling head when the walls of the coupling seat that are in contact with the coupling head can be pressed outward in the direction of the transverse axis of the dome cross-section without the wall thickness being elastically reduced transverse to the insertion direction, or respectively deforming at points by the coupling head while being pressed in. A similar deformation occurs for example when a rod is compressed in the longitudinal direction. In this case as well, lateral yielding of the rod stressed in the longitudinal direction is designated by the term buckling. This means that the thickness of the rod is not elastically deformed transverse to the longitudinal direction, but rather that the effective mechanical stress in the longitudinal direction is reduced by lateral yielding or bending.

According to another embodiment, the outer locking structure is formed by at least two outer latching bars arranged opposite each other that run parallel to the longitudinal axis of the inner dome cross-section and are arranged adjacent to the peripheral flange of the insertion opening.

As already explained above with reference to the function and arrangement of the peripheral flange, the coupling seat is held in the installation opening by the interaction, or respectively the supporting effect of the outer latching bars and the peripheral flange. The longer outer sides of the coupling seat may make it possible to design the outer latching bars longer than if they were arranged along the connecting, shorter side of the coupling seat. Nonetheless, other outer latching bars along the shorter sides of the coupling seat in addition to the outer latching bars along the longer outer sides of the coupling seat may be arranged. This is of course also possible with a curved side contour.

According to another embodiment, the outer latching bars of the outer locking structure have an approach bevel facing away from the peripheral flange, and a latching bevel facing the peripheral flange, and an angle of inclination of the approach bevel relative to the insertion direction is smaller than an angle of inclination of the latching bevel relative to the insertion direction.

With regard to the construction of the outer latching bars, the same geometric design ideas apply as described above with regard to the inner latching bars. With respect to the design of the outer latching bars, reference is therefore made to the above discussion of the geometry of the inner latching bars and the corresponding angles of the inclination of the approach bevel and latching bevel.

According to another embodiment of the coupling seat, a distance between a bottom edge of the outer latching bar facing the flange and an inner top edge of the inner latching bar facing away from the flange is greater than or equal to an inner spacing of the peripheral wall parallel to the transverse axis of the dome cross-section in the seat space of the coupling head, which may be in the insertion direction above the inner latching bars.

As already mentioned above, the coupling seat may consist of a hard plastic or hard rubber. This material is in a hard elastic state that for example is known from the material field of thermoplastics. Due to this material selection, an elastic deformation of the coupling seat is restricted when inserting and releasing the coupling bolt. Therefore, the coupling seat may have a sufficiently large depth in the insertion direction and a wall length associated therewith that permit the wall regions to buckle or yield transverse to the longitudinal axis of the dome cross-section in order to insert or remove the coupling head across the inner latching structure. In this context, it is relevant that the coupling seat, when in an installed state, abuts the inside of the installation opening of the component by the bottom edge of the outer latching bars in the direction of the flange. Correspondingly, the edge of the installation opening prevents the outside of the coupling seat from yielding radially outward relative to the installation opening. When releasing, the coupling head overcomes the latching bevel of the inner locking structure.

The pressure directed outward on the latching bevel of the inner locking structure initiates a lateral curving of the outer wall of the coupling seat, but not an elastic pressing-in of the inner latching bar. Given the hard elastic material of the coupling seat, this curving may only be sufficient to release the coupling head when the distance between the top edge of the inner latching bar, viewed relative to the flange, and the bottom edge of the outer latching bar offer a sufficient length for curving. According to a further embodiment, this length is greater than or equal to the inner spacing of the peripheral wall parallel to the transverse axis of the dome cross-section in the seat space of the coupling head of the coupling seat.

The present disclosure furthermore comprises a plug-in coupling with a coupling seat according to the above-described embodiments and with a coupling bolt with a coupling head, which may be a spherical coupling head, that can be locked in the coupling seat.

A known coupling bolt with a spherical head can be used in combination with the above-described coupling seat. Such coupling bolts are distinguished for example by a ball head and a shaft subsequent thereto with a fastening end. In addition to the ball head, lens-shaped heads or heads shaped otherwise are conceivable as long as they form a bulge which can be locked in the coupling seat.

A threaded section, for example, serves as a fastening end for the shaft of the coupling bolt. It is also conceivable to glue the coupling bolt into an opening, or weld it to a component. According to another embodiment of the plug-in coupling, the coupling bolt has two bars or wings that are arranged diametrical to each other axially below the coupling head and that, within the coupling seat, block a shift of the locked coupling head parallel to the longitudinal axis of the dome cross-section.

According to various embodiments, the coupling seat may be used to provide a floating bearing and a fixed bearing. The term "floating bearing" in this context designates the connection between the coupling seat and coupling bolt in which the coupling bolt can execute a linear compensating movement within the coupling seat in a locked state. The term "fixed bearing" designates a connection consisting of the coupling seat and coupling bolt that does not permit any movement of the coupling bolt within the coupling seat once the connection between the coupling seat and coupling bolt has been established. Whereas the above-described embodiments of the coupling seat provide a floating bearing in combination with a coupling bolt with a round shaft, a fixed bearing is realized by a coupling bolt with the two bars or wings arranged diametrical to each other. Once the coupling bolt with the support bars, or respectively support wings, is locked within the coupling seat, the support bars or support wings prevent a movement of the coupling bolt along the longitudinal axis of the dome cross-section of the coupling seat.

The present disclosure moreover comprises a connection of a first component with at least one slot-shaped installation opening in which the coupling seat is fastened according to one of the above-described embodiments, and a second component to which at least one coupling bolt with a coupling head, such as a spherical coupling head, is fastened using a fastening end facing away from the coupling head.

According to another embodiment of the above connection, the second component has at least two coupling bolts, of which one coupling bolt comprises bars or wings that are arranged diametrical to each other axially below the coupling head and block a shift within the coupling seat of the locked coupling head parallel to the longitudinal axis of the dome cross-section in order to form a connection with a constant position in a reference surface.

As already explained above, the connection consisting of the coupling seat and coupling bolt with two support bars or support wings arranged diametrical to each other achieves a constant position of the connection relative to a surface. Simultaneously, a connection with a constant position of the second component relative to the first component is also realized. Once the coupling bolt with diametrically arranged support bars or support wings is locked within the coupling seat, the coupling bolt cannot be moved linearly or rotate within the coupling seat so that the set position of the first and second component relative to each other remains constant.

The present disclosure moreover includes a production method for the above-described coupling seat in its different embodiments. This production method comprises the following steps: providing an injection mold with the complementary features with regard to the above-described embodiments of the coupling seat, injection molding the coupling seat in the provided injection mold, and demolding the coupling seat from the injection mold.

In this context, the coupling seat may be produced from a hard rubber or a hard plastic that has a lower elasticity than normal elastomers.

4. BRIEF DESCRIPTION OF THE DRAWINGS

Figure 2:
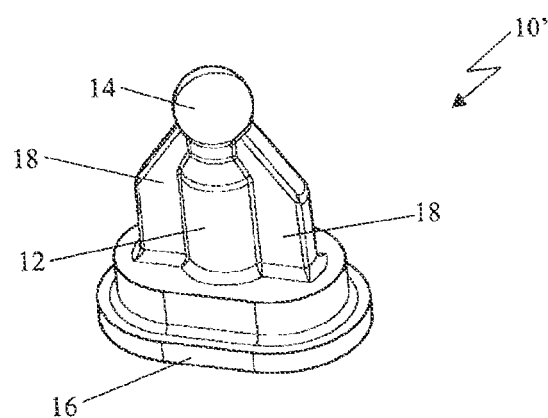
Figure 3:
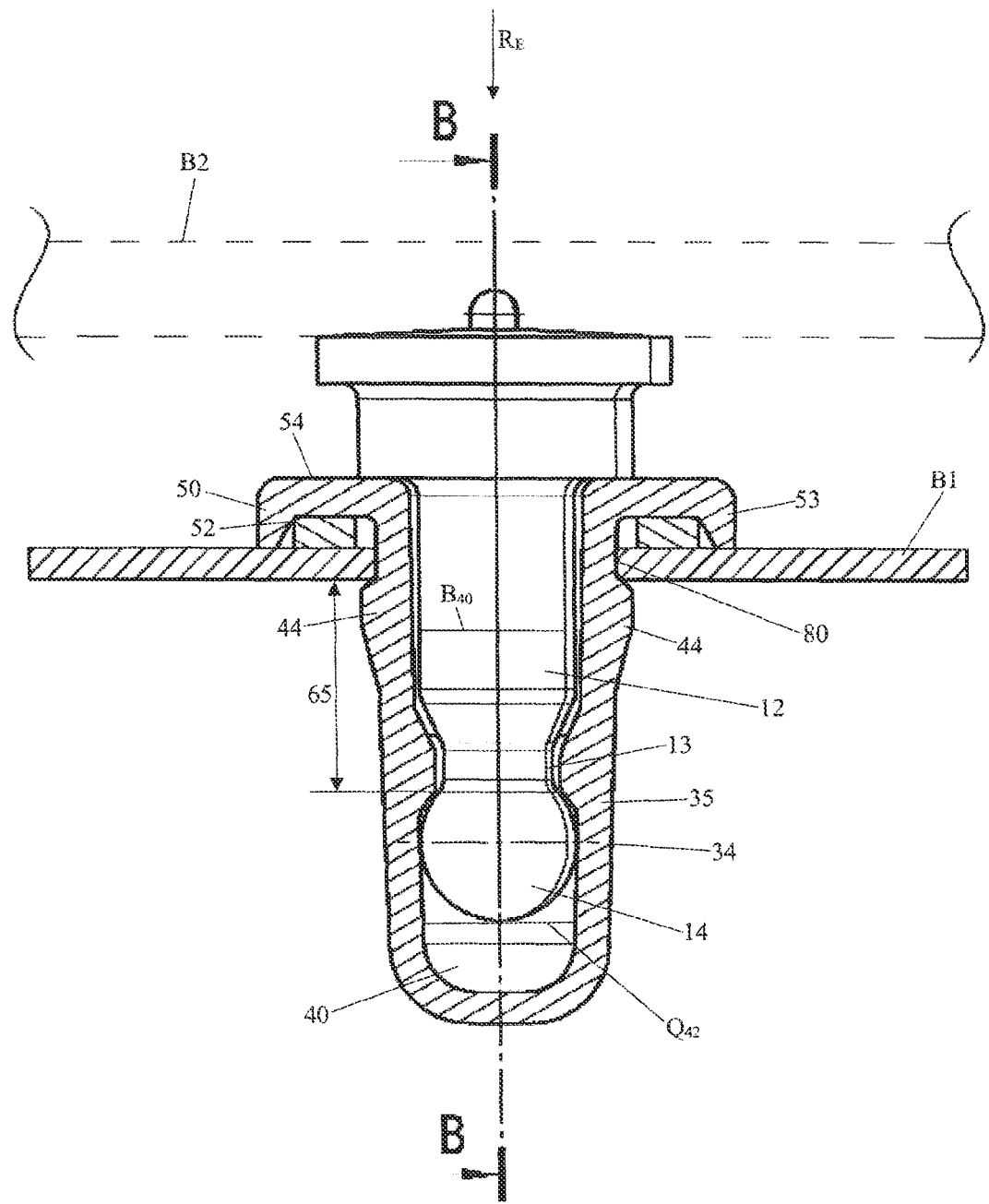
Figure 3:
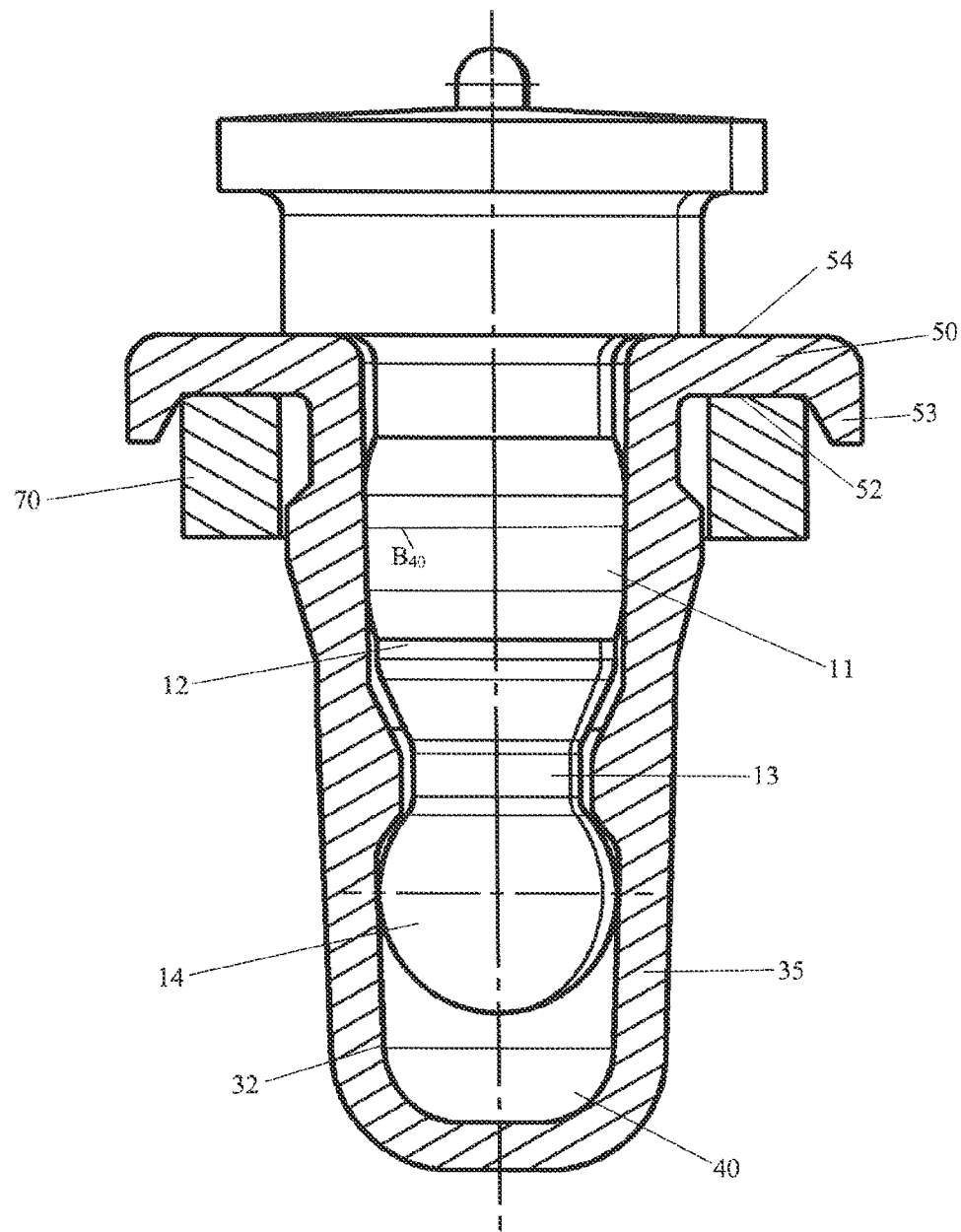
Figure 3:
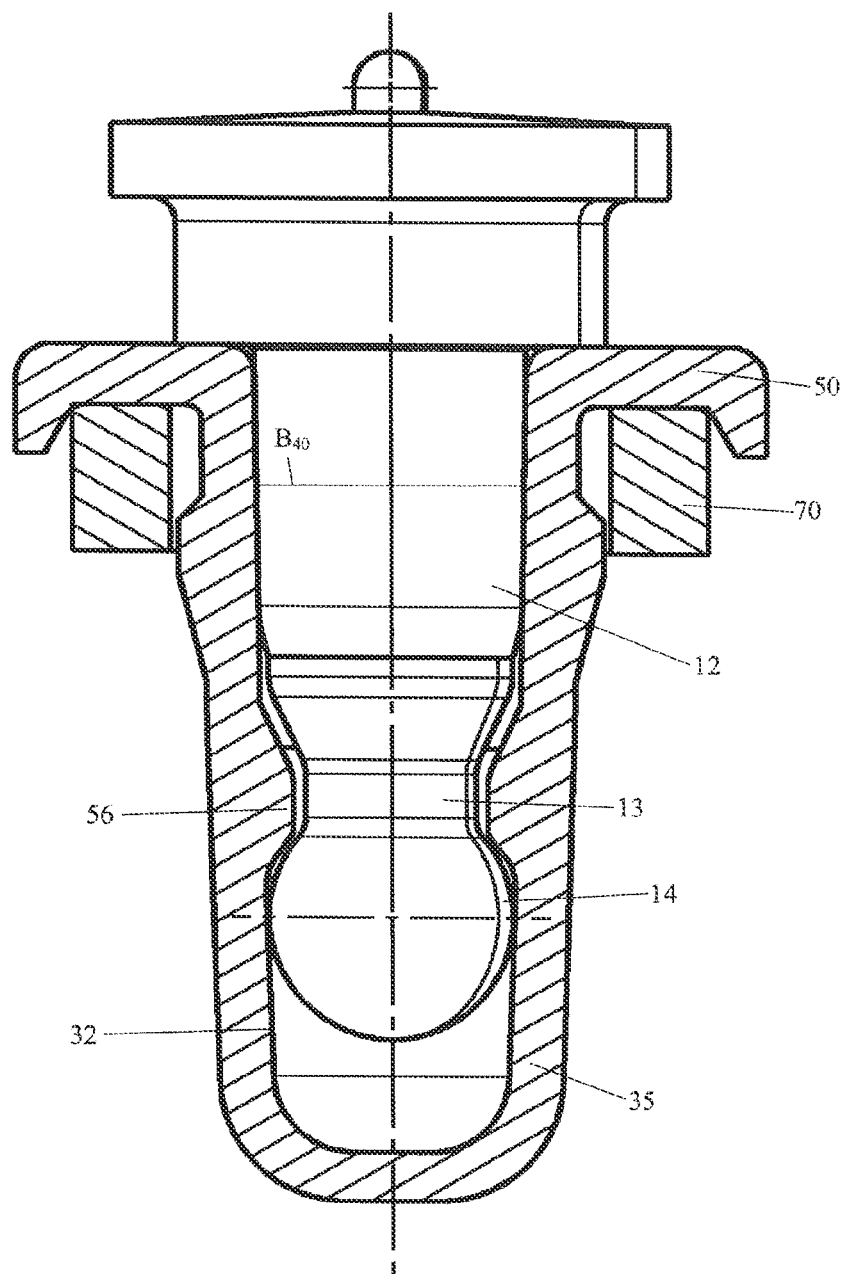
Figure 4:
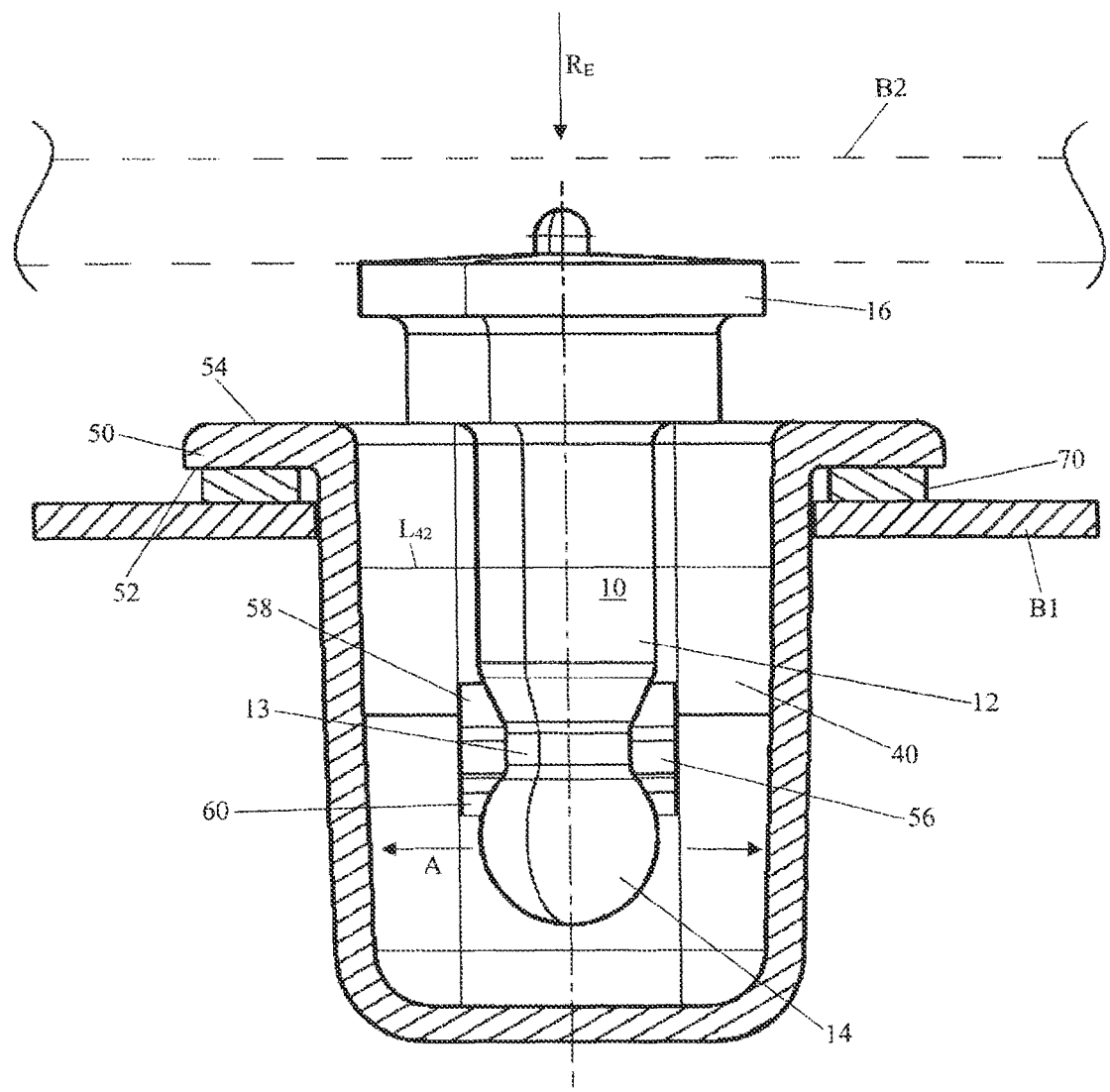
Figure 5:
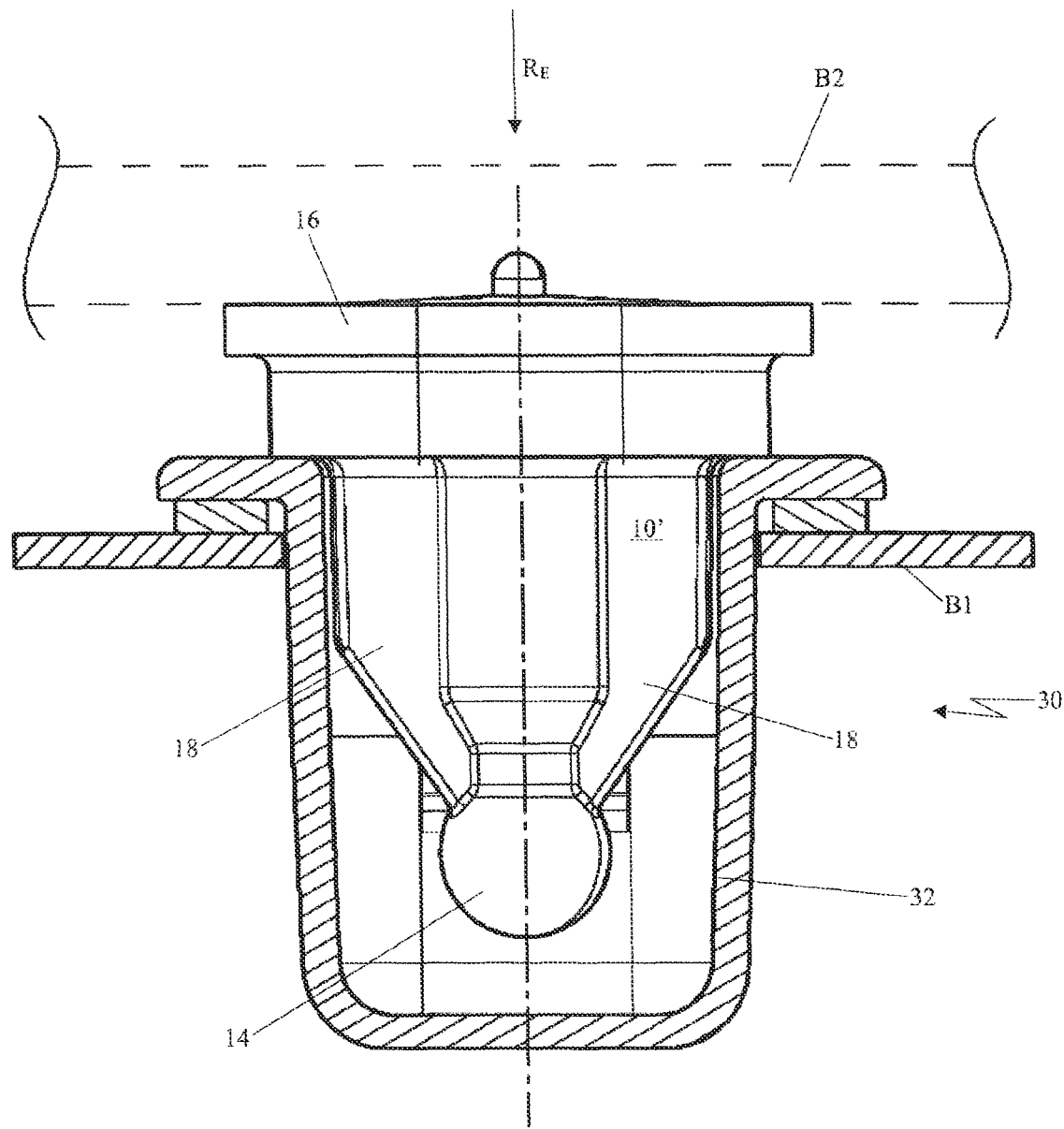
Figure 5:
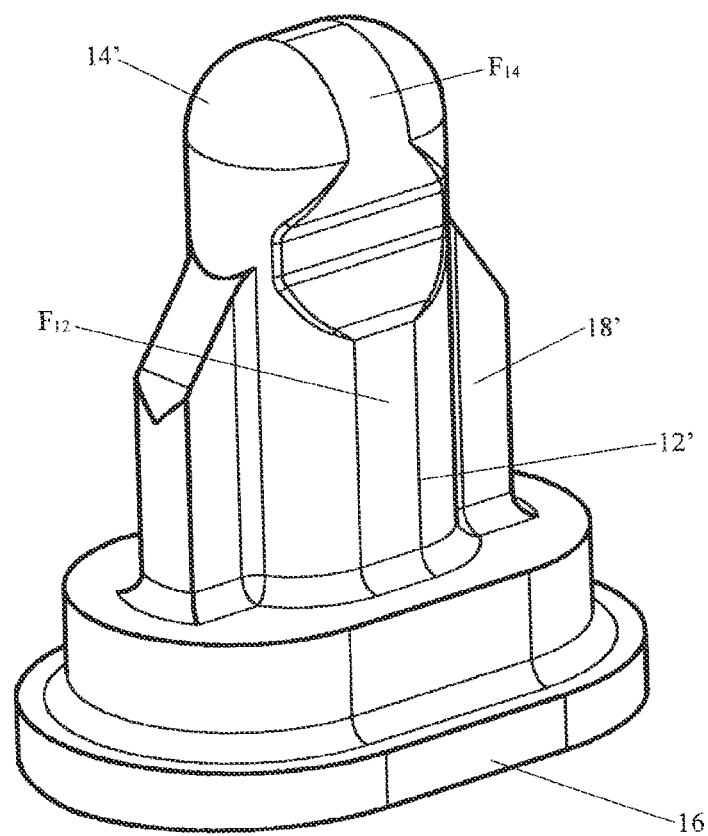
Figure 6:
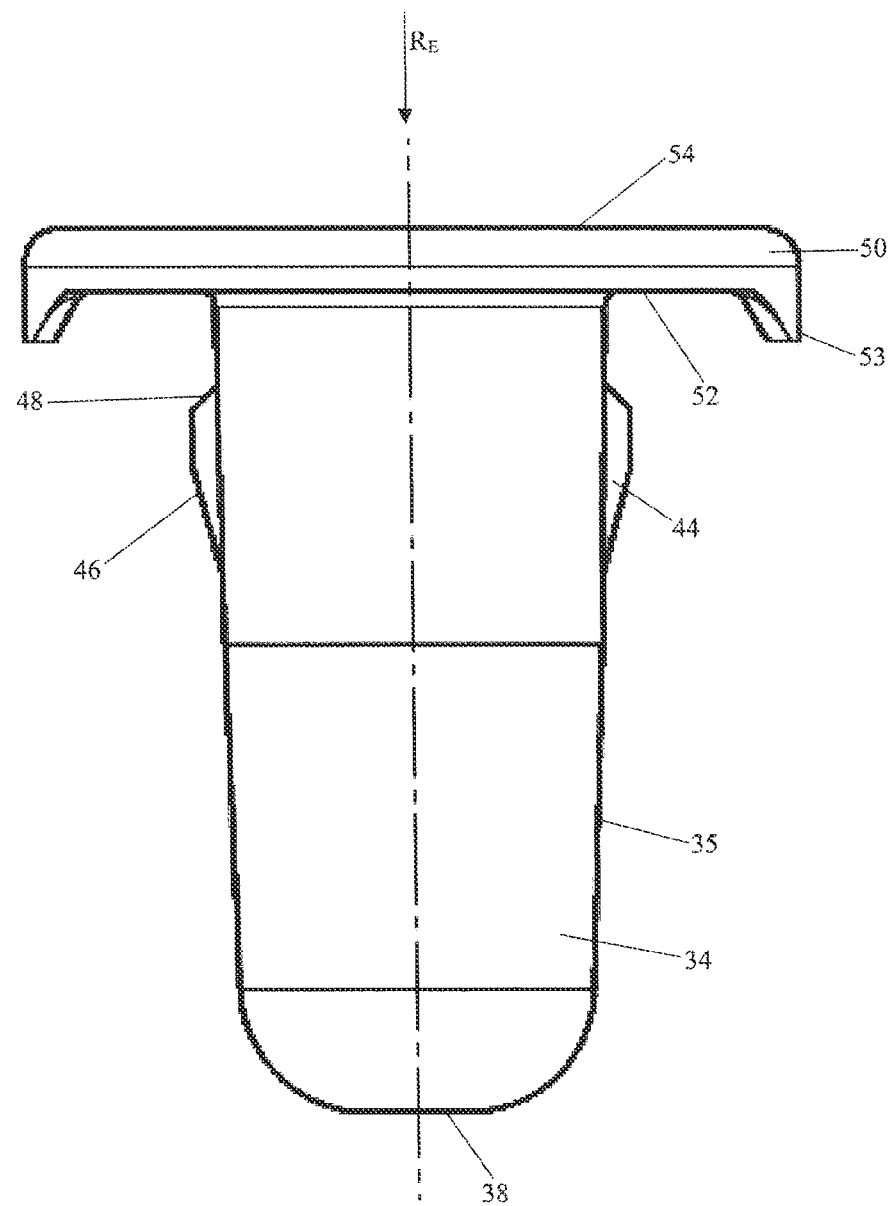
Figure 7:
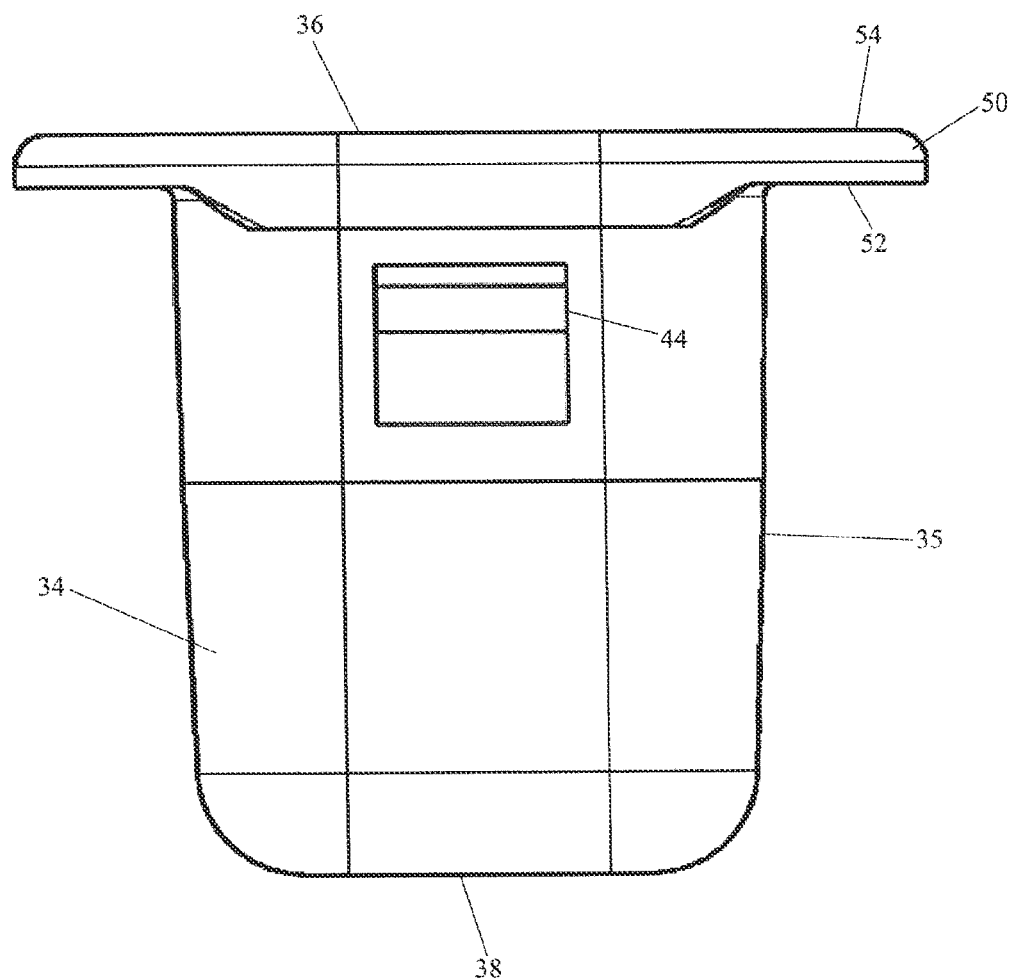
Figure 8:
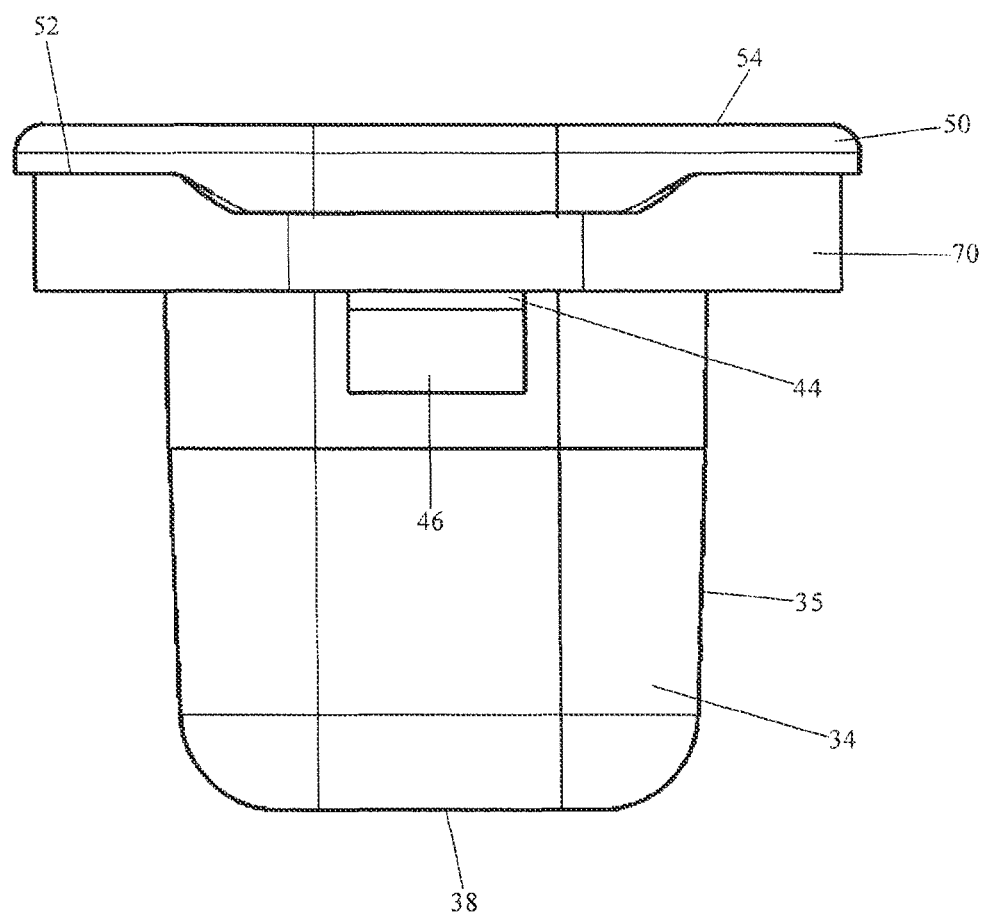
Figure 9:
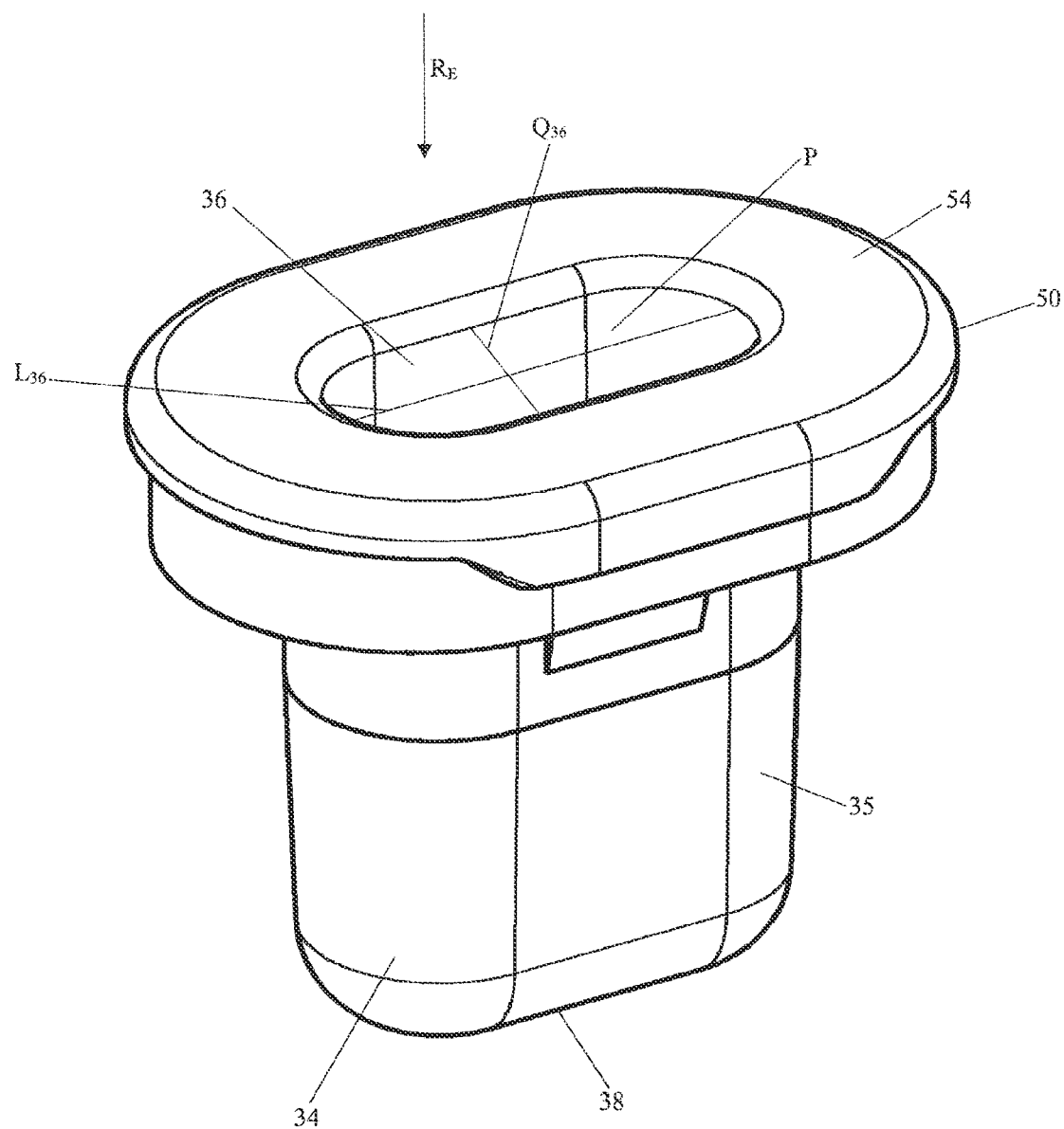
Figure 10:
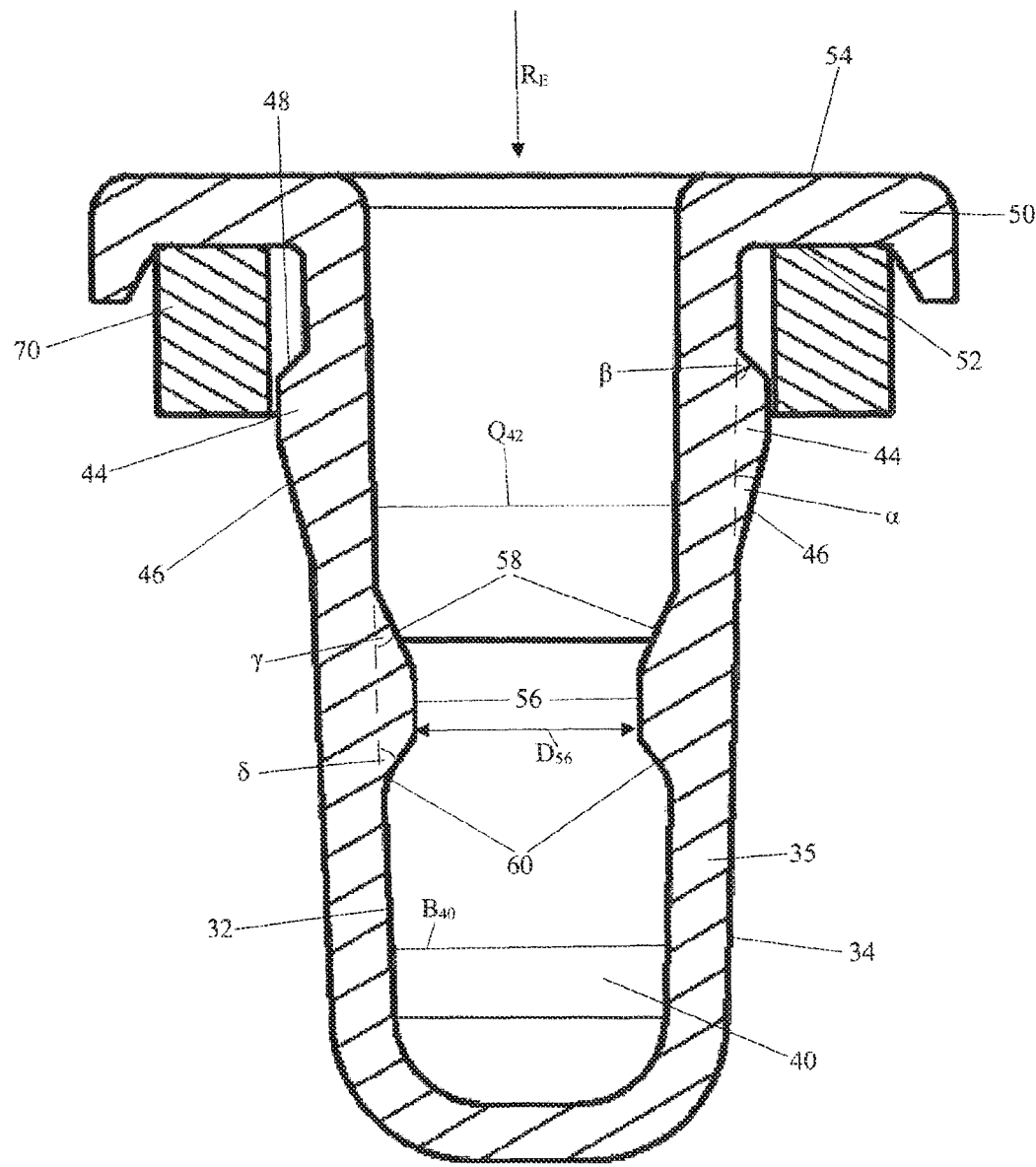
Figure 11:
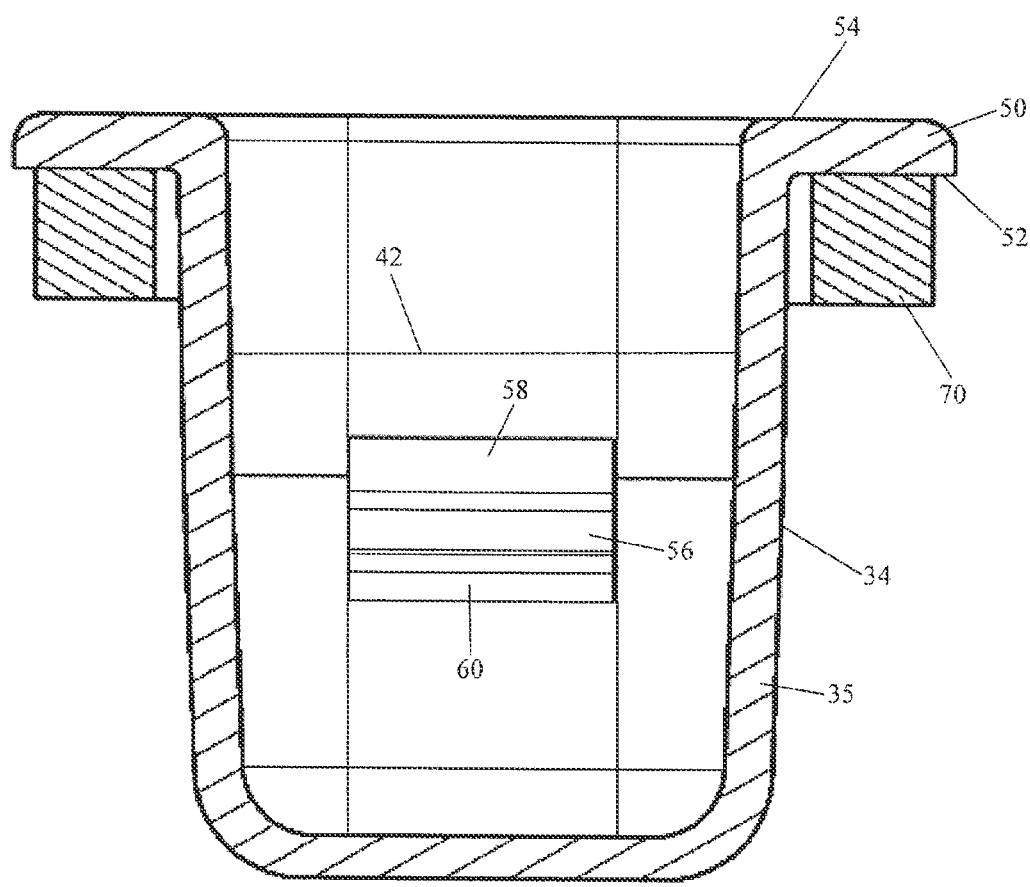
Figure 12:
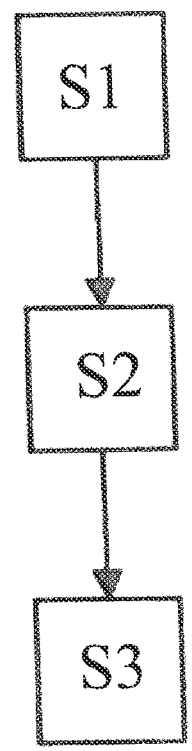

The embodiments of the present disclosure are explained in greater detail in reference to the accompanying drawing. In the figures:

FIG. 1 shows a perspective view of a plug-in coupling with a coupling seat, sealing ring, and coupling bolt with a shaft with a round cross-section, FIG. 2 shows an embodiment of the coupling bolt with two bars or wings arranged diametrical to each other, FIG. 3a) shows a sectional view of an embodiment of the plug-in coupling with a coupling seat and coupling bolt parallel to the transverse axis of the dome cross-section of the coupling seat, FIG. 3b) shows a sectional view of another embodiment of the plug-in coupling with a coupling seat and coupling bolt parallel to the transverse axis of the dome cross-section of the coupling seat, FIG. 3c) shows a sectional view of another embodiment of the plug-in coupling with a coupling seat and coupling bolt parallel to the transverse axis of the dome cross-section of the coupling seat, FIG. 4 shows a section along the line B-B from FIG. 3, FIG. 5a) shows a section along line B-B from FIG. 3 of a coupling seat in which a coupling bolt is inserted with support wings or support bars arranged opposite one another, FIG. 5b) shows another embodiment of the coupling bolt with two bars or wings arranged diametrical to each other, FIG. 6 shows an outside view of an embodiment of the coupling seat, FIG. 7 shows another outside view of a coupling seat, FIG. 8 shows an outside view of the coupling seat from FIG. 7 with a sealing ring, FIG. 9 shows a perspective view of the coupling seat with a sealing ring, FIG. 10 shows a sectional view according to FIG. 3 without a component and without an installed coupling bolt, FIG. 11 shows a sectional view according to FIG. 4 without a component and without an installed coupling bolt, and FIG. 12 shows a flowchart of an embodiment of the production method of the coupling seat.

5. DETAILED DESCRIPTION

FIG. 1 shows an exploded view of an embodiment of the plug-in coupling 1. This consists of a coupling bolt 10 and a coupling seat 30. In various embodiments of the plug-in coupling 1, the coupling seat 30 is combined with a sealing ring 70.

A first component B1 and a second component B2 are easily releasably connected to each other by the plug-in coupling 1. An example of such connections is the fastening of add-on parts such as lights, panels, etc. to the body of a motor vehicle. Depending on the design and size of the add-on parts, they are fastened with the assistance of one or more plug-in couplings 1. Correspondingly, a plurality of installation openings 80 may be provided in the first component B1 in each of which the coupling seat 30 is locked. The coupling seat 30 may be fixed securely in the installation opening 30, such as by adhesive bonding.

The second component B2 is equipped with at least one coupling bolt 10. To establish a connection, this is introduced into the coupling seat 30 and locked there. For such a connection, the combination of the coupling seat 30 and the coupling bolt 10 may be when tolerances should be compensated for between the connected components B1 and B2. Due to the round the shaft 12, the coupling bolt 10 is able to execute linear compensation movements within the coupling seat 30 in order to compensate for tolerances. Such a connection with the property of permitting compensation movements between the connected components B1, B2 is termed a floating bearing.

It is also of practical importance to connect two components B1, B2 to each other by means of at least one fixed bearing. In this case, the plug-in coupling 1' consisting of the coupling seat 30 and a further embodiment of the coupling bolt 10' do not permit a relative movement between the coupling seat 30 and the coupling bolt 10' when both are in a locked state. As can be seen in FIG. 2, the coupling bolt 10' for a fixed bearing as well as the coupling bolt 10 has a coupling head 14, a shaft 12, and a fastening end 16 on the shaft 12.

Additionally, two wings or bars 18 may extend from the shaft 12 in a diametrically opposed arrangement. The wings or bars 18 are arranged in the direction of a potential shift direction of the coupling bolt 10' within the coupling seat 30. In this manner, a compensation movement of the coupling bolt 10' within the coupling seat 30 is prevented that would be possible for the coupling bolt 10 within the coupling seat 30. In this manner, the connection consisting of the coupling seat 30 and coupling bolt 10' with wings 18 forms a fixed bearing of the two components B1, B2 connected to each other.

According to further embodiments, e.g. elongated second components B2 are exposed to lengthwise longitudinal fluctuations due to thermal stresses which require a connection to the first component B1 with a tolerance compensation. At the same time, it should however also be ensured that the second component B2, which may be an elongated taillight with a length within a range of 1-2 m is reliably immovably fastened at a specific position to the body. Consequently, components B2 subjected to tolerances are connected by at least two plug-in couplings 1 which form a floating bearing and a fixed bearing (see above). Correspondingly, an elongated taillight as the second component B2 may be equipped with a plurality of coupling bolts 10, 10', of which one coupling bolt 10' comprises the wing 18. This defines the fixed fastening position of the taillight, whereas tolerances in the connection by the plug-in coupling 1 consisting of the coupling bolt 10 and the coupling seat 30 are compensated for.

To illustrate a fixed bearing, FIG. 5a shows a coupling bolt 10' with wings 18 that is locked in the coupling seat 30.

It can be seen that the wings 18 terminate transversely to the insertion direction $R_E$ of the coupling bolt 10' in the coupling seat 30 directly adjacent to an inner wall 32 of the coupling seat 30. Consequently, compensation movements of the coupling bolt 10' transverse to the insertion direction $R_E$ within the coupling seat 30 are prevented.

FIG. 5b shows an alternative configuration of the coupling bolt 10". In this design, the wings 18' have a shorter axial extension in comparison to FIG. 5a. In order to nonetheless be able to block a movement of the coupling bolt 10" within the seat space 40 of the coupling seat 30 using the wings 18", the shaft 12' is designed with a slot-shaped cross-section. The longer side of the slot-shaped cross-section of the shaft 12' runs parallel to the longitudinal axis $L_{42}$ of the dome cross-section 42.

Surface segments $F_{12}$ and $F_{14}$ may be arranged on the shaft 12' and/or on the head 14' (see FIG. 5b) that run parallel to the longitudinal axis $L_{42}$. According to a further configuration, the thickness of the shaft 12' parallel to the transverse axis $Q_{42}$ corresponds to the transverse width $B_{40}$ of the seat space 40. If the coupling bolt 10" is locked in the coupling seat 30, the surface segments $F_{12}$ and $F_{14}$ abut the inner wall 32 of the coupling seat 30. The precisely fitting connection may support the retention force and may realize an integrated form fit between the coupling seat 30 and coupling bolt 10".

The connection of a floating bearing is shown in FIG. 3a-c and FIG. 4. The coupling bolt 10 arranged in the coupling seat 30 may be able to carry out compensation movements A there, transverse to the insertion direction $R_E$. This does not impair or loosen the connection between the coupling bolt 10 and the coupling seat 30.

The coupling seat 30 in FIG. 1 is shown in an enlarged perspective view in FIG. 9. Lateral representations can be found in FIGS. 6 to 8.

The coupling seat 30 comprises a closed, peripheral wall 35 without penetrations that forms the inner wall 32 and the outer wall 34. Viewed in the insertion direction $R_E$, the peripheral wall 35 first defines a slot-shaped insertion opening 36. The coupling bolt 10; 10' is inserted through the insertion opening 36 into the coupling seat 30 and locked there.

Due to the slot-shaped design of the insertion opening 36, an opening cross-section P of the insertion opening 36 can be described by a longitudinal axis $L_{36}$ and a shorter transverse axis $Q_{36}$. Moreover, the peripheral wall 35 defines a dome with an inner seat space 40 and a closed end 38 of the coupling seat 30. The inner seat space 40 is qualified by a slot-shaped dome cross-section 42 transverse to the insertion direction $R_E$. The dome cross-section 42 is also defined by a longitudinal axis $L_{42}$ and a transverse axis $Q_{42}$. According to a further embodiment, the dome cross-section 42 substantially corresponds to the opening cross-section P of the insertion opening 36. The peripheral wall 35 with the inner wall 32 extends almost perpendicular to the flange 50 which surrounds the insertion opening 36.

The flange 50 may extend to the outside perpendicular to the outer wall 34, and forms a first and a second contact surface 52, 54. The first contact surface 52 may serve as a support surface in a connection of the coupling seat 30 to the first component B1. Once the coupling seat 30 has been inserted into the slot-shaped installation opening 80, the first contact surface 52 abuts the first component B1.

In this context, a seal, in particular a sealing ring 70, may be arranged between the flange 50 and the first component B1. The sealing ring 70 is compressed between the first contact surface 52 of the flange 50 and the first component B1 in order to realize a connection which may be liquid-tight and sealed against contamination between the coupling seat 30 and the first component B1.

The peripherally arranged sealing ring 70 may consist of foam rubber, rubber, silicone, or another suitable sealing material.

In order to not overload the arranged sealing ring 70 in a compressed state between the contact surface 52 and the first component B1, contact bars 53 may be provided on the flange 50. The contact bars 53 extend from the contact surface 52 in the insertion direction $R_E$. Two contact bars 53 which may be arranged opposite each other are provided parallel to the longitudinal axis $L_{36}$ of the insertion opening 36. Other contact bars parallel to the transverse axis $Q_{36}$ or a contact bar 53 surrounding the flange 50 may be arranged.

The contact bars 53 abut the first component B1 in the connection between the coupling seat 30 and the first component B1. The sealing ring 70 may have a thickness in the insertion direction $R_E$ that is greater than the length of the contact bar 53 in the insertion direction $R_E$. The sealing ring 70 is thereby sealingly compressed in the connection, but not overloaded or damaged by the connection.

The contact bar 53 may yield laterally upon excessive mechanical stress in the connection to the component B1. A mechanical overload of the flange 50 and coupling seat 30 is thereby avoided.

If the coupling seat 30 is inserted into the slot-shaped installation opening 80, it locks there with the assistance of the outer locking structure. The outer locking structure comprises outer latching bars 44 that run parallel to the longitudinal axis $L_{36}$, $L_{42}$ of the opening cross-section P and the dome cross-section 42, and are arranged opposite each other.

The outer latching bars 44 have an approach bevel 46 which an edge of the installation opening 80 approaches when inserting the coupling seat 30 into the installation opening 80. Moreover, the latching bar 44 has a latching bevel 48, behind which, or respectively against which, the edge of the installation opening 80 of the first component B1 locks.

As for example can be seen from FIG. 10, an angle of inclination α of the approach bevel 46 is smaller than an angle of inclination β of the latching bevel 48. This geometric design ensures that an installation force for locking the coupling seat 30 across the approach bevel 46 in the installation opening 80 is smaller than a releasing force to release the coupling seat 30 across the latching bevel 48 from the installation opening 80.

Analogous to the outer locking structure, an inner locking structure is provided in the seat space 40 of the coupling seat 30 to releasably lock the coupling bolt 10; 10'. The inner locking structure comprises two latching bars 56 arranged opposite each other. The latching bars 56 may run parallel to the longitudinal axis $L_{36}$, $L_{42}$ of the insertion opening 36 or the dome cross-section 42. Moreover, the inner latching bars 56 each have an approach bevel 58 facing the insertion opening 36. On the side of the inner latching bars 56 facing away from the insertion opening 36, a latching bevel 60 is provided for the coupling bolt 10; 10'. Analogous to the outer latching bars in 44, an angle of inclination γ of the approach bevel 58 is smaller than an angle of inclination δ of the latching bevel 60.

Accordingly, the installation or connecting force of the coupling bolt 10; 10' to overcome the approach bevel 58 may be smaller than a releasing force to overcome the latching bevel 60. Consequently, the strength of the connection between the coupling bolt 10; 10' and the coupling seat 30 may be adjusted by the angle of inclination δ of the latching bevel 60.

According to another embodiment, the strength of the connection between the coupling bolt 10; 10' and the coupling seat 30 can be adjusted by the distance $D_{56}$ between the inner latching bars 56 arranged opposite each other. While the connection is being released, the coupling head 14 with its head diameter presses the inner latching bars 56 outward against the retaining force of the wall 35 and pass it. Due to the highly elastic material of the coupling seat 30, the coupling head 14 does not in so doing elastically press into the wall 35. The seat space 40 may have a width $B_{40}$ in the insertion direction $R_E$ above the inner latching bars 56 parallel to the transverse axis $Q_{42}$, $Q_{36}$. According to a further embodiment, the width $B_{40}$ corresponds to a diameter of the coupling head 14. In order to set the releasing force of the coupling head 14 from the coupling seat 30 sufficiently high, the following may hold true for the spacing $D_{56}$ of the inner latching bars 56:

$0.65 \cdot B_{40} \leq D_{56} \leq 0.9 \cdot B_{40}$, or $0.78 \cdot B_{40} \leq D_{56} \leq 0.82 \cdot B_{40}$.

Corresponding to the aforementioned dimensions, the coupling head 14 may be held in the coupling seat 30 in a friction lock and form fit when the diameter of the coupling head corresponds to or is greater than the width $B_{40}$.

The guidance of the coupling head 14 in the seat space 40 may provide a centering of the coupling head 14 in the seat space 40. In this case, the distance $D_{56}$ between the latching bars 56 is the same as the inner wall distance $B_{40}$ in the seat space 40 so that the inner latching bars 56 do not exist.

In a further connection of the two components B1, B2 by means of at least two plug-in couplings, e.g. a coupling seat 30 with the dimension $D_{56} < B_{40}$ creates a force fit and a form fit connection which can be designed as a fixed or floating bearing. This connection is sufficient for the specific positioning and/or arrangement of the two components B1, B2 relative to each other. Correspondingly, the second plug-in connection with the coupling seat 30 without inner latching bars 56, i.e., $D_{56} = B_{40}$, serves as a guide for the coupling bolt 10 in the event of tolerances, etc. that arise.

In order to support the load transfer between the coupling bolt 10 and the adjacent inner wall 32, the coupling head 14 and the shaft 12 may be equipped with flattened surface segments $F_{14}$, $F_{16}$ instead of the round shape. These may run parallel to the longitudinal axis $L_{42}$ and lie against the inner wall 32 in the connection to transfer load.

To insert and release the coupling head 14 from the coupling seat 30, the coupling head 14 presses the sections of the wall 35 with the inner latching bars 56 outward. According to a further embodiment of the coupling seat 30, it does not consist of an elastically deformable material like elastomer. Such an elastic material would not offer sufficient retention for the coupling bolt 10; 10' in the event of frequent load changes between the two components B1, B2 so that the connection could release.

Consequently, the coupling seat 30 may be made from a hard elastic material with an elasticity modulus of $E \geq 1000$ MPa. This material property of thermoplastics is known at room temperature and lower temperatures, i.e., generally below the softening range. The coupling seat 30 may be injection molded from polyamide.

According to various material configurations, the coupling seat 30 may consist of polyamide, polyamide PA 66, polyamide with a fiberglass component, PA66 with a fiberglass component, and POM (polyoxymethylene). In this case, other plastics are also useful that have similar properties.

The coupling bolts 10, 10', 10" may consist of metal or plastic. A plastic may be PPA (polyphthalamide) with or without fiberglass reinforcement (GF), which may be PPA-GF 50.

Since the coupling seat 30 may consist of a hard elastic material such as hard plastic or hard rubber, the coupling head 14 cannot release from the coupling seat 30 by elastic material deformation. Instead, a wall length 65 is sufficiently large so that the wall 35 can bulge outward despite the support in the installation opening 80. The wall length 65 extends from the latching bevel 48 which abuts the first component B1. The wall length 65 may terminate at the latching bevel 60 abutted by the coupling head 14. The wall section 65 between the bottom edge of the outer latching bar 44 facing the flange 50 and a top edge of the inner latching bar 56 facing away from the flange 50 and lying on the inside may be greater than or equal to an inner distance B 40 of the peripheral wall 32 parallel to the transverse axis Q 42 of the dome cross-section 42 in the seat space 40.

Once the coupling bolt 10 is inserted into the coupling seat 30 and is locked there in the seat space 40, it is held in this position by the inner latching bars 56. This can be seen in FIGS. 3a to 3c.

According to a further embodiment, the coupling head 14 locks in the insertion direction $R_E$ within the seat space 40 above the inner latching bars. In so doing, the inner latching bars 56 engage in the recess 13 in the coupling bolt 10. According to the configuration shown in FIG. 3a, the shaft 12 of the coupling bolt 10 may be designed undersized in comparison to the inner width $B_{40}$ of the coupling seat 30. This available clearance of the shaft 12 in the coupling seat 30 supports the mobility of the coupling bolt in the coupling seat 30.

In order to avoid a mechanical load on the coupling seat 30 or wear thereof, or in order to more securely hold the coupling bolt 10 in comparison to FIG. 3a, the dimensions of the shaft 12 are adapted to the inner width $B_{40}$. For this, the shaft 12 is shaped to tightly fit as shown in FIG. 3c. There, a shaft diameter $D_{12}$ is the same as the inner width $B_{40}$ of the seat space 40 parallel to the transverse axis.

Alternatively to this (see FIG. 3c), the shaft 12 has a radial shaft thickening 11. The shaft thickening 11 abuts the inner wall 32 of the coupling seat 30 in the same way as the shaft 12 from FIG. 3b.

With the assistance of the configurations in FIGS. 3b and 3c and the precisely fitting arrangement of the coupling bolt 10 in the coupling seat 30 shown therein, an advantageous, flat or areal load transfer between the coupling bolt 10 and coupling seat 30 may be realized. This ensures an integrated form fit between the coupling seat 30 and coupling bolt 10. Moreover, this arrangement reduces the wear of both components 30, 10.

According to another embodiment, the retaining force between the inner latching bars 56 and the coupling bolt 10 can be specifically increased. To this end, the shaft 12 and coupling head 14 may be provided with a slot-shaped cross-section. The longitudinal axis of the slot-shaped cross-section is arranged parallel to the longitudinal axis $L_{42}$ of the dome cross-section 42. Due to this flattened geometry of the coupling bolt 10, there is a linear contact and support between the coupling seat 30 and coupling bolt 10 instead of a point contact as similarly depicted in FIG. 5b. Then the coupling bolt 10" may be used without the wings 18'.

As can be seen with reference to FIG. 4, the inner latching bars 56 restrict a movement of the coupling bolt 10 opposite the insertion direction $R_E$. Transverse to the insertion direction $R_E$, the seat space 40 provides a gap which permits the compensation movement in the direction of the arrows A. During these compensation movements, the inner bars 56 may guide the coupling bolt 10 when they engage in the peripheral recess 13 in the coupling bolt 10 between the coupling head 14 and the shaft 12.

Also, in at least some implementations, the coupling seat 30 does not have any inner latching bars that run parallel to the transverse axis $Q_{36}$, $Q_{42}$. This is because the inner latching bars 56 offer sufficient retention for the coupling bolt 10; 10'.

As already mentioned above, the coupling seat 30 may be produced by means of an injection molding method. In the context of this injection molding method, an injection mold is provided in a step S1 with the complementary features with respect to the above-described embodiments of the coupling seat 30. In step S2, the coupling seat 30 is injection molded into the provided injection mold. Then the coupling seat 30 is demolded from the injection mold in step S3.

The invention claimed is:

1. A coupling seat designed as a single part which can be locked into a slot-shaped installation opening of a component and provides a seat space in which the coupling head of a coupling bolt can be releasably locked and, when in a locked state, can be moved linearly in the seat space, and has the following features:
    a. a closed peripheral wall of a cupola-shaped dome surrounds the seat space of the coupling head of the coupling bolt, wherein the dome has an outer locking structure to fasten the coupling seat in the installation opening of the component, an open end with a slot-shaped insertion opening for inserting the coupling head of the coupling bolt in an insertion direction $R_E$ and a closed end with an inner locking structure adjacent thereto for the coupling head of the coupling bolt,
    b. a slot-shaped opening cross-section of the insertion opening, as well as a slot-shaped inner dome cross-section of the seat space, each perpendicular to the insertion direction $R_E$, are defined by a longitudinal axis and a shorter transverse axis running transverse thereto, and
    c. the inner locking structure of the cupola-shaped dome comprises only two inner latching bars that are arranged opposite each other on an inner wall of the seat space and run parallel to the longitudinal axis of the inner dome cross-section, have a distance $D_{56}$ with respect to each other and form an undercut opposite the insertion direction $R_E$, wherein the seat space has in the insertion direction $R_E$ above and below the inner latching bars parallel to the shorter transverse axis a width $B_{40}$, wherein the shorter axis extends transverse,
    d. the inner locking structure does not comprise latching bars parallel to the transverse axis of the inner dome cross-section, and permits movement of a locked coupling bolt along the inner latching bars in the seat space transverse to the insertion direction $R_E$, and
    e. the insertion opening has a peripheral flange running around the insertion opening which projects radially outward and comprises a contact surface transverse to the insertion direction, wherein the longer sides of the flange that oppose each other have contact bars that project in the insertion direction $R_E$, and
    f. a sealing ring is arranged on the contact surface of the peripheral flange in a channel-shaped construction between the outer wall of the coupling seat and the contact bars.

2. The coupling seat according to claim 1 in which the inner latching bars of the inner locking structure have an approach bevel facing the insertion opening and a latching bevel facing away from the insertion opening, and an angle of inclination of the approach bevel relative to the insertion direction is smaller than an angle of inclination of the latching bevel relative to the insertion direction $R_E$.

3. The coupling seat according to claim 2, the outer locking structure of which is formed by at least two outer latching bars arranged opposite each other that run parallel to the longitudinal axis of the inner dome cross-section and are arranged adjacent to the peripheral flange of the insertion opening.

4. The coupling seat according to claim 3 in which the outer latching bars of the outer locking structure have an approach bevel facing away from the peripheral flange, and a latching bevel facing the peripheral flange, and an angle of inclination of the approach bevel relative to the insertion direction is smaller than an angle of inclination of the latching bevel relative to the insertion direction.

5. The coupling seat according to claim 1, the outer locking structure of which is formed by at least two outer latching bars arranged opposite each other that run parallel to the longitudinal axis of the inner dome cross-section and are arranged adjacent to the peripheral flange of the insertion opening.

6. The coupling seat according to claim 5 in which the outer latching bars of the outer locking structure have an approach bevel facing away from the peripheral flange, and a latching bevel facing the peripheral flange, and an angle of inclination of the approach bevel relative to the insertion direction is smaller than an angle of inclination of the latching bevel relative to the insertion direction.

7. The coupling seat according to claim 5 in which a distance between a bottom edge of the outer latching bar facing the flange and an inner top edge of the inner latching bar facing away from the flange is greater than or equal to an inner spacing of the peripheral wall parallel to the transverse axis of the dome cross-section in the seat space of the coupling head.

8. A plug-in coupling with a coupling seat according to claim 1 and a coupling bolt with a coupling head that can be locked in the coupling seat.

9. The plug-in coupling according to claim 8, the coupling bolt of which has two bars or wings that are arranged diametrical to each other axially below the coupling head and that, within the coupling seat, block a shift of the locked coupling head parallel to the longitudinal axis of the dome cross-section.

10. A connection of a first component with at least one slot-shaped installation opening in which the coupling seat according to claim 1 is fastened, and a second component to which at least one coupling bolt with a coupling head is fastened by a fastening end facing away from the coupling head.

11. The connection according to claim 10 in which the second component has at least two coupling bolts, of which one coupling bolt has bars or wings that are arranged diametrical to each other axially below the coupling head and block a shift within the coupling seat of the locked coupling head parallel to the longitudinal axis of the dome cross-section in order to form a connection with a constant position of the second component with respect to the first component.

12. A production method for a coupling seat according to claim 1, having the following steps:
   providing an injection mold with the complementary features with regard to the coupling seat,
   injection molding the coupling seat in the provided injection mold, and
   demolding the coupling seat from the injection mold.

13. The production method according to claim 12, in which the coupling seat is made of a hard rubber or a hard plastic with an elasticity modulus of $E \geq 1000$ MPa.

* * * * *